US007415003B1

(12) United States Patent
Ogura et al.

(10) Patent No.: US 7,415,003 B1
(45) Date of Patent: Aug. 19, 2008

(54) COMMUNICATION NETWORK MANAGING SYSTEM, ELEMENT AND NETWORK MANAGERS THEREFOR, AND COMPUTER-READABLE RECORDING MEDIUM IN WHICH COMMUNICATION NETWORK MANAGING PROGRAM IS RECORDED

(75) Inventors: Takao Ogura, Kawasaki (JP); Kenichi Fukuda, Kawasaki (JP); Makoto Minoura, Kawasaki (JP); Hitoshi Ueno, Kawasaki (JP); Kohei Iseda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 872 days.

(21) Appl. No.: 09/670,462

(22) Filed: Sep. 26, 2000

(30) Foreign Application Priority Data

Nov. 12, 1999 (JP) ................................. 11-322736

(51) Int. Cl.
H04L 12/26 (2006.01)
G06F 15/173 (2006.01)
H04J 1/16 (2006.01)
(52) U.S. Cl. ........................ 370/351; 370/229; 709/224
(58) Field of Classification Search ................. 370/468, 370/224, 252, 395.5, 395.51; 709/223, 224, 709/225, 226, 229
See application file for complete search history.

(56) References Cited

U.S. PATENT DOCUMENTS 6,072,777 A * 6/2000 Bencheck et al. ........... 370/244
6,260,062 B1 * 7/2001 Davis et al. ................. 709/223
6,331,986 B1 * 12/2001 Mitra et al. ................. 370/468
6,356,627 B1 * 3/2002 Hayball et al. ......... 379/112.01
6,463,470 B1 * 10/2002 Mohaban et al. ............ 709/223
6,570,867 B1 * 5/2003 Robinson et al. ............ 370/351
6,611,867 B1 * 8/2003 Bowman-Amuah ......... 709/224
6,667,956 B2 * 12/2003 Beshai et al. ............... 370/238
6,718,377 B1 * 4/2004 Bischoff et al. ............. 709/223
6,748,432 B1 * 6/2004 Du et al. ..................... 709/224
2003/0078962 A1 * 4/2003 Fabbricatore et al. ....... 709/203
2003/0161032 A1 * 8/2003 Amoruso ................. 359/341.1

* cited by examiner

Primary Examiner—Huy D. Vu
Assistant Examiner—Clemence Han
(74) Attorney, Agent, or Firm—Katten Muchin Rosenman LLP

(57) ABSTRACT

In a communication network managing system, at a network manager, a management section manages QoS (Quality of Service) capability management information from element managers, a request reception section receives a request for a target QoS capability, and a section and notification section selects a candidate subnetwork such as to satisfy the target QoS capability for which the request has been received by the request reception section, and notifies the corresponding element managers of information about the selection. At the individual element manager, based on the selection information from the selection and notification section of the network manager, a control section controls the corresponding subnetwork.

24 Claims, 10 Drawing Sheets

COMMUNICATION NETWORK MANAGING SYSTEM, ELEMENT AND NETWORK MANAGERS THEREFOR, AND COMPUTER-READABLE RECORDING MEDIUM IN WHICH COMMUNICATION NETWORK MANAGING PROGRAM IS RECORDED

BACKGROUND OF THE INVENTION

1. Field of the Invention

The present invention relates to a communication network managing system, an element manager and a network manager for the use in the system, and a computer-readable recording medium in which a communication network management program is recorded.

2. Description of the Related Art

Nowadays, a communication network is constructed using a variety of base technologies (transmission methods), such as SDH (Synchronous Digital Hierarchy), PDH (Presiochronous Digital Hierarchy), ATM (Asynchronous Transfer Mode), WDM (Wavelength Division Multiplex) and IP (Internet Protocol). And the communication network is divided into subnetworks in a many variety of topologies, such as access networks, core networks, PDH networks and SDH networks. The communication network is thus complicated. Consequently these individual domains that constitute the communication network are managed by element managers or agents called EMSs (Element Management Systems), and these element managers are concentratedly managed by a network manager called NMS (Network Management System). Thus management of the whole communication network is accomplished.

In the conventional network management, however, partly because in the conventional connection-less network, such as IP network, QoS (Quality of Service) has not been guaranteed, and communication traffic running through plural domains depends on the QoS capability of those domains, communication service guaranteeing the requested QoS cannot be provided until the requested QoS is satisfied in all the domains without exception.

For the same reasons, the user's requested QoS cannot also be sufficiently guaranteed by TV conference and voice application for which guarantee of the request QoS is significant, and audio-visual (picture and voice) applications, such as Video on Demand, for which applications guarantee of the requested QoS is fairly significant, and other applications which need real-time performance.

As a hypothetical attempt, collecting the individual QoS capability one for each of the individual units, through which communication traffic (user data) travels, by the above-mentioned element manager (EMS) and then selecting a unit satisfying the requested QoS as an element through which communication traffic runs, could be suggested. But this would consume huge time to perform network control on an end-to-end basis.

SUMMARY OF THE INVENTION

With the foregoing problems in view, it is an object of the present invention to guarantee the user's requested QoS exactly at high speed without managing the QoS capabilities in terms of elements one constituting each domain, each when communication traffic satisfying the user's requested QoS travels through a plurality of domains.

To accomplish the above object, according to a first feature of the present invention, there is provided a system for managing a communication network composed of a plurality of subnetworks, comprising: a plurality of element managers provided one for each of the plural subnetworks for individual management thereof; and a network manager accommodating the plural element managers for concentrated management thereof; each of the plural element managers having a collection and notification section for collecting QoS (Quality of Service) capability management information on the corresponding element manager and notifying the network manager of the collected QoS capability management information; the network manager having a management section for concentratedly managing various QoS capabilities of the whole communication network, based on the QoS capability management information collected and notified by the individual element managers, and a request reception section for receiving a request for a target QoS capability, and a selection and notification section for selecting a candidate subnetwork having a QoS capability such as to satisfy the target QoS capability, for which the request has been received by the request reception section, based on the various QoS capabilities being managed by the management section, and for notifying the element manager corresponding the selected candidate subnetwork of selection information indicating that the candidate subnetwork has been selected; each element manager further having a control section for controlling the corresponding subnetwork based on the selection information notified by the selection and notification section of the network manager.

According to a second feature of the present invention, there is provided a system for managing a communication network composed of a plurality of subnetworks, comprising: a plurality of element managers provided one for each of the plural subnetworks for individual management thereof; and a network manager accommodating the plurality element managers for concentrated management thereof; each of the plural element managers having a collection and notification section for collecting QoS (Quality of Service) capability management information on the corresponding element manager and notifying the network manager of the collected QoS capability management information; the network manager having a management section for concentratedly managing various QoS capabilities of the whole communication network, based on the QoS capability management information collected and notified by the individual element managers.

According to a third feature of the present invention, there is provided an element manager for use in a communication network managing system, which manages a communication network composed of a plurality of subnetworks and includes a plurality of element managers corresponding to the plural subnetworks and a network manager accommodating the plural element managers, the element manager comprising: a collection and notification section for collecting QoS (Quality of Service) capability management information to be used in managing the corresponding subnetwork, and for notifying the network manager of the collected QoS capability management information; and a control section for controlling the corresponding subnetwork based on information which is obtained by the network manager having a function of concentratedly managing QoS capabilities of the communication network based on the QoS capability management information collected and notified by the collection and notification section and which is notified from the network manager on the candidates subnetwork having a QoS capability such as to satisfy a target QoS capability for the corresponding subnetwork.

According to a fourth feature of the present invention, there is provided an element manager for use in a communication network managing system, which manages a communication network composed of a plurality of subnetworks and includes a plurality of element managers corresponding to the plural subnetworks, and a network manager accommodating the plural element managers, wherein the element manager has a collection and notification section for collecting QoS capability management information to be used in managing the corresponding subnetwork, and for notifying the network manager of the collected QoS capability management information.

According to a fifth feature of the present invention, there is provided a network manager for use in a communication network managing system, which manages a communication network composed of a plurality of subnetworks and includes a plurality of element managers corresponding to the plural subnetworks, and a network manager accommodating the plural element managers, the network manager comprising: a management section for concentratedly managing various QoS (Quality of Service) capabilities of the whole communication network, base don QoS capability management information of the corresponding subnetworks, which information has been collected and notified by the individual element managers; a request reception section for receiving a request for a target QoS capability; and a selection and notification section for selecting a candidate subnetwork having a QoS capability such as to satisfy the target QoS capability, for which the request has been received by the request reception section, based on the various QoS capabilities being managed by the management section, and for notifying the element manager corresponding to the selected subnetwork of selection information that the candidate subnetwork has been selected.

According to a sixth feature of the present invention, there is provided a network manager for use in a communication network managing system which manages a communication network composed of a plurality of subnetworks and includes a plurality of element managers corresponding to the plural subnetworks, and a network manager accommodating the plural element managers, wherein the network manager has a management section for concentratedly managing various QoS (Quality of Service) capabilities of the whole communication network, based on QoS capability management information of the corresponding subnetworks, which information has been collected and notified by the individual element managers. With this arrangement, since upon receipt of a request for QoS capability, the network manager selects a subnetwork having a candidate QoS capability satisfying the requested QoS capability and then renders a subnetwork manager corresponding to the selected subnetwork to control the same subnetwork, it is possible to guarantee the requested QoS stably at high speed, even in setting communication traffic via a plurality of subnetworks, without managing the QoS capability in units of the individual subnetwork managers.

As an additional feature to the fifth or sixth feature of the present invention, the management section is constructed to concentratedly manage the various QoS capabilities of the communication network and those of another communication network independent of the last-named communication network in view of also QoS capability management information of other subnetworks that constitute the another communication network. With this construction, it is possible to select a subnetwork satisfying the QoS for another communication network As another additional feature of the fifth or sixth feature of the present invention, the management section is constructed to manage supported tagging, as additional information, for discrimination on combination of the subnetworks. With this construction, it is possible to facilitate discriminating the QoS capability with a combination of subnetworks, reducing time to select a subnetwork having a candidate QoS capability and to control the selected subnetwork.

As still another additional feature to the fifth or sixth feature of the present invention, the management section is constructed to update the various QoS capabilities of the communication network when the QoS capability management information is updated. With this construction, since the QoS capability being managed is automatically updated when the guaranteeable QoS capability varies due to introduction of a new subnetwork into the present system, change of subnetworks or congestion of communication network, it is possible to retain (manage) latest QoS capacity management information all the time so that an appropriate subnetwork can be selected.

As an additional feature to the fifth feature of the present invention, the selection and notification section is constructed to previously select two or more of the subnetworks when selecting the candidate subnetworks having communication QoS capabilities such as to individually satisfy the target QoS capability, for which the request has been received by the request reception section, to firstly notify one element manager, corresponding to a first one of the candidate subnetworks, of the previous selection of the plural subnetworks and secondly notify another element manager, corresponding to a second one of the candidate subnetworks, of unable information that the corresponding subnetwork cannot be controlled, upon receipt of the unable information as a response from the element manager corresponding to the first candidate subnetwork. With this construction, even if the notified subnetwork cannot be controlled, the next candidate subnetwork is automatically selected and controlled, thus realizing a more stable network control satisfying the requested quality of service.

As an alternative additional feature to the fifth feature of the present invention, the selection and notification section is constructed to select two or more of the subnetworks according to preset priorities when selecting the candidate subnetworks having QoS capabilities such as to individually satisfy the target QoS capability, for which the response has been received by the request reception section, and to notify one element manager, corresponding to a higher-priority one of the candidate subnetworks, of the selection. With this construction, it is possible to realize a more stable network control satisfying the requested quality of service and to improve the quality of service so that the communication networks can be used efficiently.

According to a seventh feature of the present invention, there is provided a computer-readable recording medium in which a program is recorded for instructing a computer to be used in a communication network management system including a plurality of element managers corresponding to a plurality of subnetworks that constitute a communication network, and a network manager accommodating the plural element managers, wherein the program instructs the computer to function as the following: collecting and notifying means for collecting QoS (Quality of Service) capability management information on the corresponding element manager and notifying the network manager of the collected QoS capability management information; and control means for controlling the corresponding subnetwork based on information which is obtained by the network manager having a function of concentratedly managing various QoS capabilities of the whole communication network based on the QoS capability management information collected and notified by the collecting and notifying means and which is notified from the network manager on the candidate subnetwork having a QoS capability such as to satisfy a target QoS capability for the individual subnetwork.

According to an eighth feature of the present invention, there is provided a computer-readable recording medium in which a program is recorded for instructing a computer to be used in a communication network managing system including a plurality of element managers corresponding to a plurality of subnetworks that constitute a communication network, and a network manger accommodating the plural element managers, wherein the program instructs the computer to function as collecting and notifying means for collecting various QoS capability management information on the individual element managers and notifying the network manager of the collected QoS capability management information.

According to a ninth feature of the present invention, there is provided a computer-readable recording medium in which a program is recorded for instructing a computer to be used in a communication network managing system including a plurality of element managers corresponding to a plurality of subnetworks that constitute a communication network, and a network manager accommodating the plural element managers, wherein the program instructs the computer to function as the following: managing means for concentratedly managing various QoS (Quality of Service) capabilities of the whole communication network, based on QoS capability management information of the corresponding subnetworks, which information is collected and notified by the individual element managers; request receiving means for receiving a request for target QoS capability; and selecting and notifying means for selecting a candidate subnetwork having a QoS capability such as to satisfy the target QoS capability, for which the request has been received by the request receiving means, based on the QoS capabilities being managed by the managing means, and for notifying the element manager corresponding the selected subnetwork of selection information that the candidate subnetwork has been selected.

According to a tenth feature of the present invention, there is provided a computer-readable recording medium in which a program is recorded for instructing a computer to be used in a communication network management system including a plurality of element managers corresponding to a plurality of subnetworks that constitute a communication network, and a network manager accommodating the plural element managers, wherein the program instructs the computer to function as managing means for concentratedly managing various QoS (Quality of Service) capabilities of the network, based on QoS capability management information of the corresponding subnetworks, which information has been collected and notified by the individual element managers.

DESCRIPTION OF THE PREFERRED EMBODIMENTS

Preferred embodiments of the present invention will now be described with reference to the accompanying drawings. Like reference numbers or characters designate similar parts or elements throughout several views of different embodiments.

(A) First Embodiment

Figure 1:
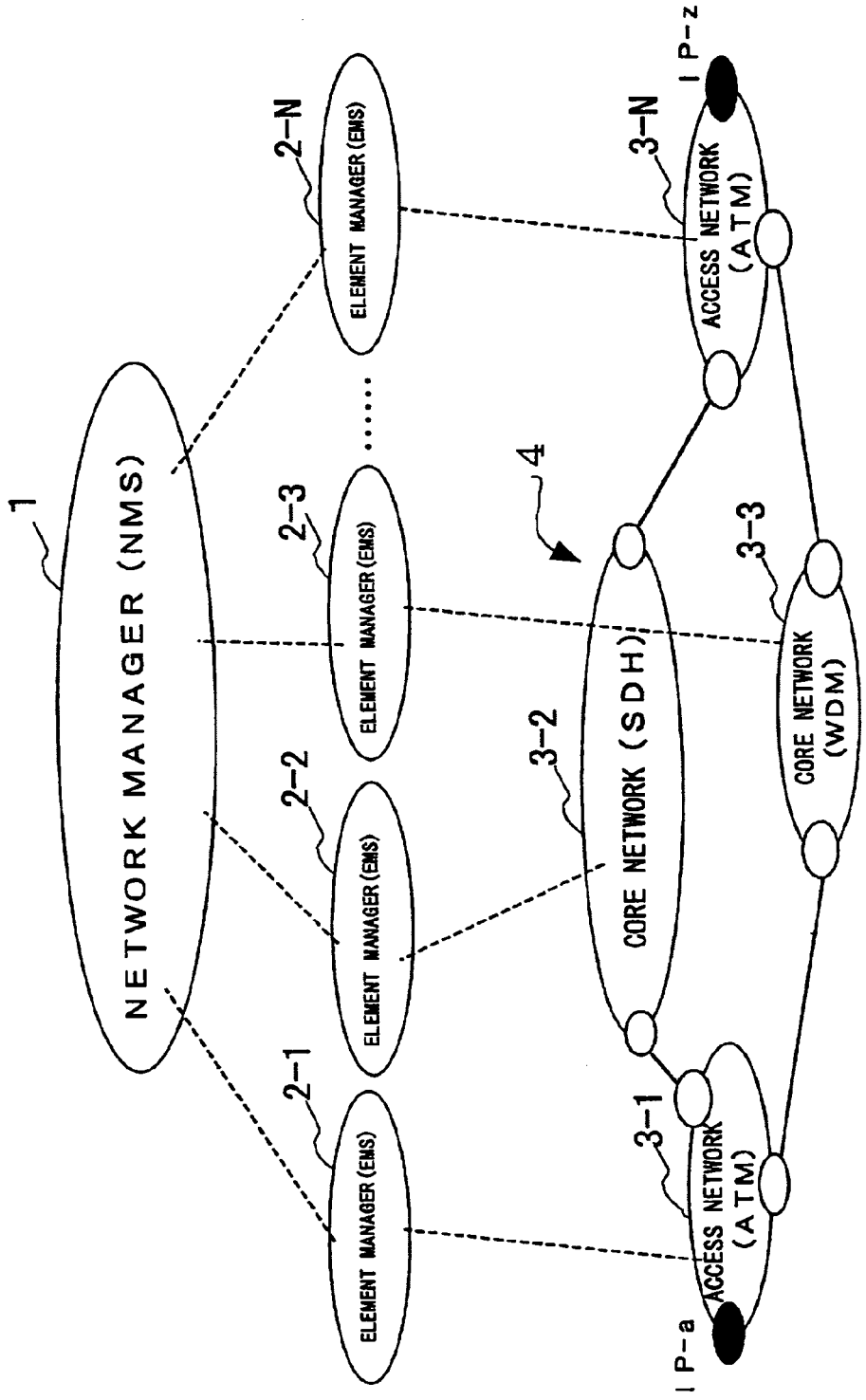
FIG. 1 is a bock diagram showing a communication network managing system according to a first embodiment of the present invention.

FIG. 1 is a block diagram showing a communication network managing system according to a first embodiment of the present invention. The managing system of FIG. 1 comprises a plurality of element managers or agents known as EMS (Element Management System) 2-i (i=1, 2, . . . , N) corresponding to a plurality of domains (subnetworks) 3-1, 3-2, . . . 3-N (N is an integer larger than 1) that constitute a communication network 4, and a network manger known as NMS (Network Management System) 1 accommodating these element managers 2-i.

The individual domains 3-i have various technologies and/or topologies. For example, in FIG. 1, the domains 3-1, 3-N are in the form of access networks (ATM); the domain 3-2, in the form of a core network (SDH); the domain 3-3, in the form of a core network (WDM). Thus this communication network 4 is constructed according to multiple technologies (topologies).

Figure 2:
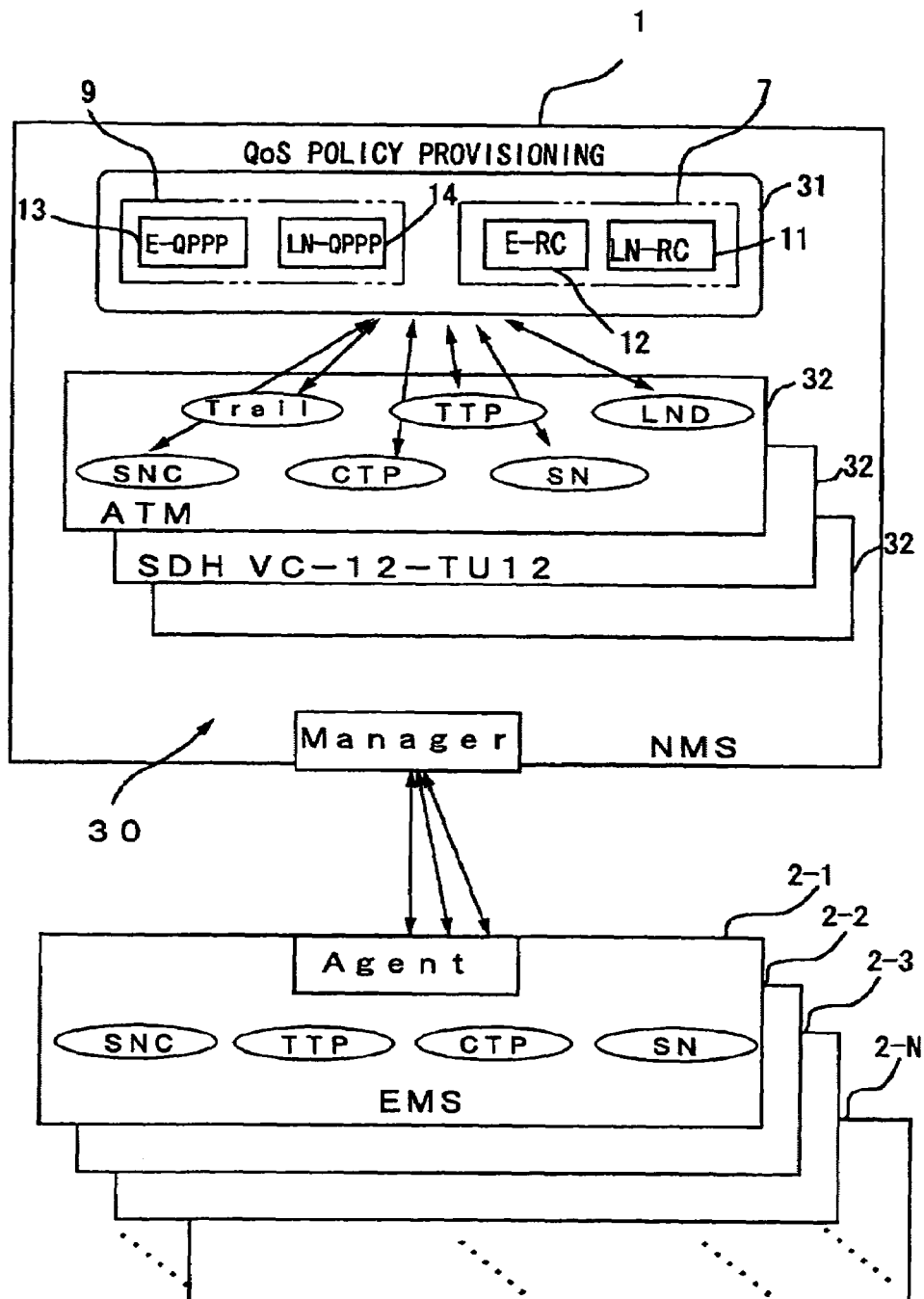
FIG. 2 is a block diagram showing how a network manager and an element manager (or agent) work in the system of the first embodiment.

NMS 1 and EMS 2-i are in a manage-and-agent relationship as shown in FIG. 2. NMS 1 includes, as managing objects 30, a function object group 31 for performing a control (QoS policy provisioning) over the communication network 4, and an information object group 32 for managing network information (QoS capability management information).

The information object group 32, as shown in FIG. 2, is composed of various information objects, such as SN (Subnetwork), SNC (Subnetwork Connection), CTP (Connection Termination Point), TTP (Trail Termination Point), LND (Layer Network Domain), and Trail. The information object group 32 is provided for every layer, such as a VP (Virtual Path)/VC (Virtual Channel) layer in ATM or a VC (Virtual Container)/TU (Tributary Unit) layer in SDH.

These information object groups 32 are created based on the information objects (SN, SNC, CTP, TTP, etc.), which are under collection and management by EMS 2-i, upon notification from EMS 2-i. These information object groups 32 are managed by a common function object group 31 so that NMS 1 can select (network control, i.e. QoS policy provisioning) a domain 3-i, through which end-to-end communication traffic travels, such as to satisfy a request QoS. Alternatively a plurality of function object groups 31 may be provided one for each of the plural information object groups 32.

Figure 4:
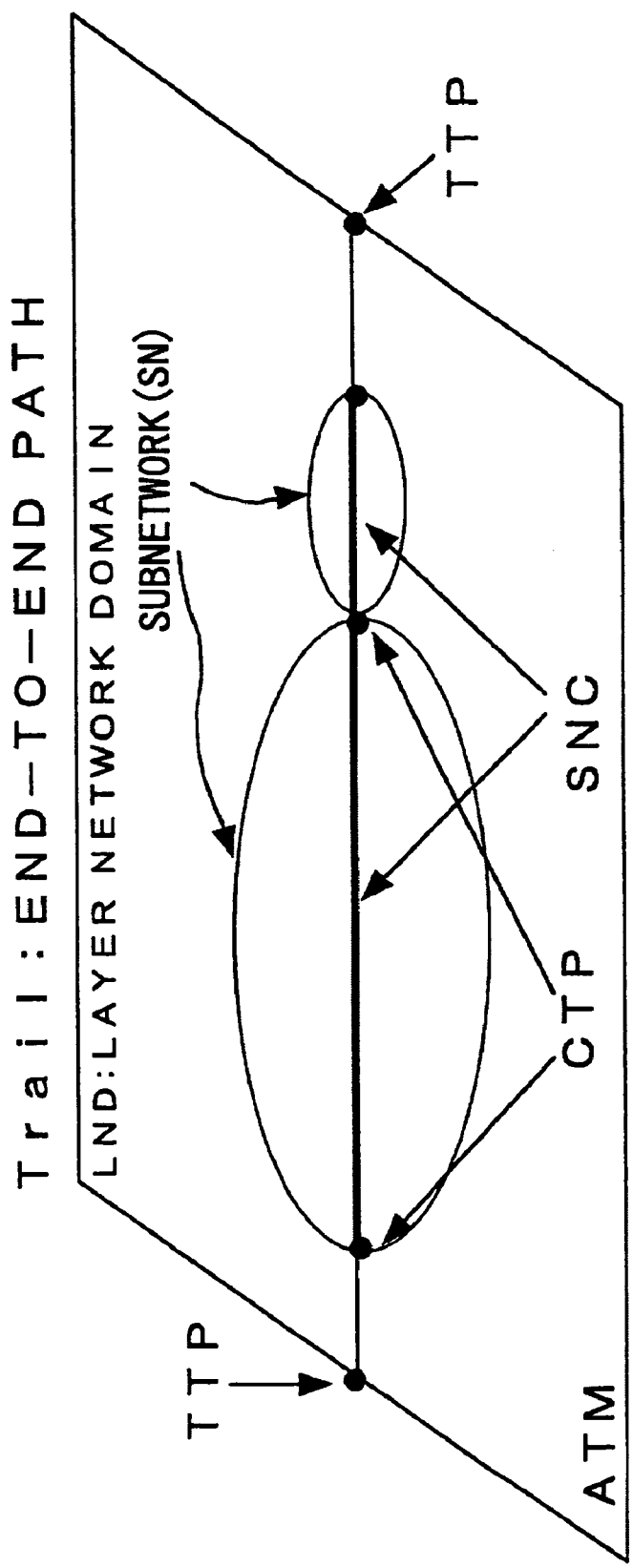
FIG. 4 is a schematic diagram illustrating an information object to be managed in the system of the first embodiment.

The information objects (SN, SNC, CTP, LND, TTP, Trail) are network information such as illustrated in a more easily understandable manner in FIG. 4. SN is information identifying the domain (subnetwork) 3-i; SNC, information representing a path in SN; CTP, information indicating a joint of SN and SNC. And LND is information, identifying a layer; Trail, information indicating an end-to-end path; TTP, information indicating a terminal end of Trail.

Among these information objects, LND and Trail cannot be grasped by EMS 2-i until a after NMS 1 unifies the information objects (SN, SNC, CTP, TTP) notified from EMS 2-i.

Figure 3:
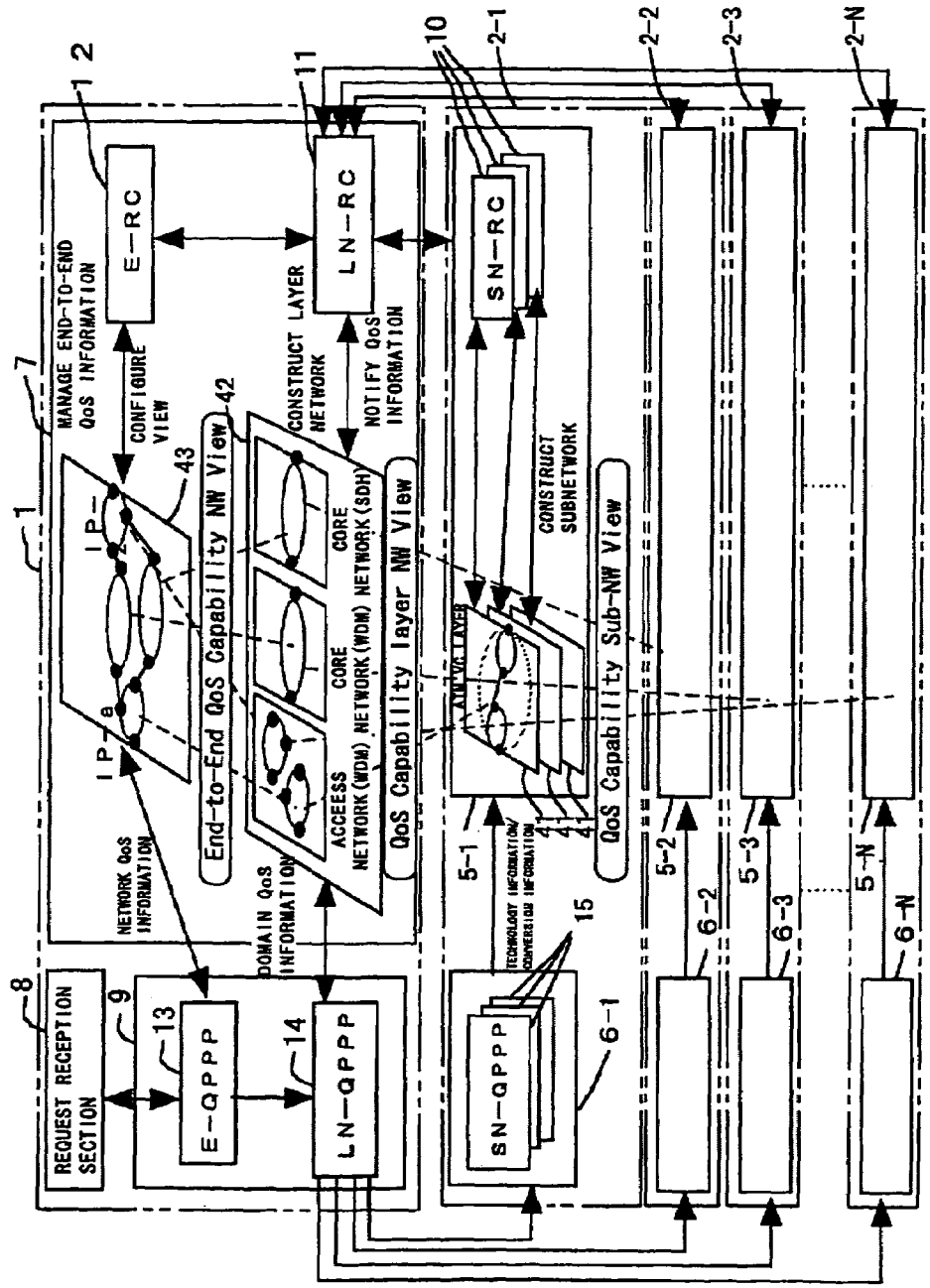
FIG. 3 is a detail block diagram of the system according to the first embodiment.

NMS 1 and EMS 2-i will now be described in detail. FIG. 3 is a detail block diagram of the managing system of FIG. 1. Each EMS 2-i includes a collection and notification section (collecting and notifying means) 5-i, and a control section (control means) 6-i. NMS 1 in the meantime includes a management section (managing section) 7, a request reception (request receiving means) 8, and a selection and notification section (selecting and notifying means) 9.

The collection and notification section 5-i of EMS 2-i is equipped with a plurality of subnetwork resource configurators (SN-RC) 10 one for each of the layers that exist in the corresponding domain (whom EMS 2-i is in charge of) 3-i; the other collection and notifications 5-2, . . . 5-N are not illustrated in FIG. 3. These SN-RCs 10 serve to collect the above-mentioned information objects, as QoS capability management information, of the domain 3-i for each and every corresponding layer, and then to notify NMS 1 of the collected information objects.

Figure 5:
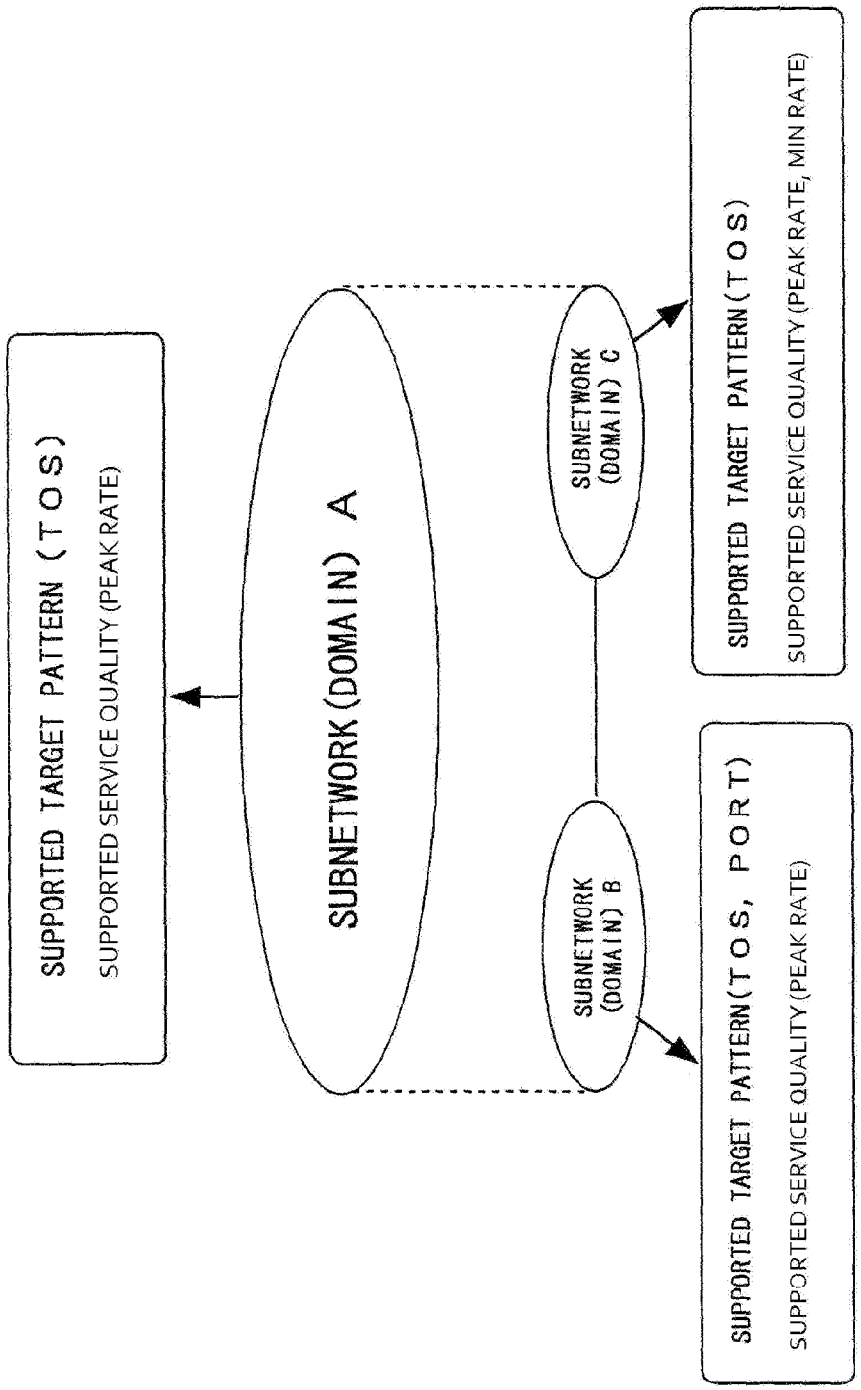
FIG. 5 is a schematic diagram illustrating conditions under which QoS (Quality of Service) of a subnetwork (or domain) is determined in the system of the first embodiment.

At that time, the collection and notification section 5-i sends to NMS 1 only the information objects that are related to QoS capability of the whole domain. Assuming that, as shown in FIG. 5, a particular domain A is composed of two domains B and C, the collection and notification section 5-i sends only the information objects about the AND condition of capabilities of the two domains B and C, namely, those about the QoS capabilities that can be supported by both of the domains B and C.

In other words, at the domain B, the support target pattern representing a QoS-guaranteeable target (kind) is "TOP (Type of Service)" and "Port" so that the requested QoS named "Peak Rate" can be guaranteed to the support target pattern ("TOS" and "Port"). Meanwhile at the domain C, since the support target pattern is only "TOS" so that the requested QoS named "Peak Rate" and "Min Rate" can be guaranteed to "TOS", the AND condition of both the information that the pattern of the QoS-guaranteeable target for the whole support domain A is "TOS" and the information that the support service quality is "Peak Rate", is notified to NMS 1 as the QoS capability of the domain A.

Like the collection and notification section 5-1 of NMS 2-1, each of the collection and notification sections 5-2, . . . , 2-N of the other EMS 2-2, . . . 2-N has non-illustrated SN-RCs for every layer of the corresponding domain 3-i. These SN-RCs serve to collect information objects of the corresponding domain and then to notify NMS 1 of the collected information objects.

Meanwhile, at NMS 1, the management section 7 includes, as function objects, a layer network model resource configurator (LN-RC) 11 and an end-to-end resource configurator (E-RC) 12 (see FIGS. 2 and 3). LN-RC 11 configures a QoS capability layer NW view 42, which is to be used in managing the QoS capability of the individual domain, for every layer network, namely, for each of various technologies, such as access network (ATM), core network (WDM) and core network (SDH), based on the information objects notified from SN-RC 10 of EMS 2-i.

And E-RC 12 configures an end-to-end QoS capability NW view 43, which is to be used in managing the end-to-end QoS capabilities of the united all technologies, based on the network model (information model) of each technology of the QoS capability NW view 42.

If the communication network 4 is structured as shown in FIG. 1, the end-to-end QoS capability NW view 43 is composed of four domains, and QoS information of the individual domain is managed as an SN (Subnetwork) managed object as shown in TABLE 1 below.

TABLE 1

SN MANAGED OBJECTS

| SN-id | Supported Target Pattern | Supported Service Quality | Supported Tagging |
|---|---|---|---|
| 1 Domain 3-1 | Source-IP, Dest-IP | Peak Rate, Min Rate, BestEffort | Port:1 |
| | TOS, Port | Peak Rate, Min Rate, Priority BestEffort | |
| 2 Domain 3-2 | Source-IP, Dest-IP Port:1 | Peak Rate, Min Rate | |
| 3 Domain 3-3 | Source-IP Port | Peak Rate, Min Rate | |
| 4 Domain 3-N | Source-IP, Dest-IP | Peak Rate, Min Rate, Priorityt | |
| | TOS, Port | Peak Rate, Min Rate, Priority BestEffort | |

In TABLE 1, a subnetwork id (SN-id) represents an identification of a domain 3-i. For example, the subnetwork id of the domain 3-1 in FIGS. 1 and 2 is 1, and likewise the SN-ids of the domains 3-2, 3-3, 3-N are respectively represented by 2, 3, 4.

And, as mentioned above, Supported Target Pattern indicates a target (kind) of guarantee of QoS, and Supported Service Quality indicates a quality that can be guaranteed to the target.

Further in the Supported Target Pattern column, "Source-IP" and "Dest-IP" respectively represent a source IP address and a destination IP address; "Port", a port number of a source or destination terminal; "TOS", an IP service quality to be sent. And in the Supported Service Quality column, "Min Rate" represents a minimum rate to be guaranteed to the supported target pattern; "Peak Rate", a peak rate to be guaranteed. And "Priority" represents a policy control that can be made for the supported target pattern; "BestEffort" indicates that transmission is made with the best effort.

The actual meaning of "Min Rate" is: assuming that a requested QoS (rate) is 20 Mbps, basically the requested rate (20 Mbps) is guaranteed at minimum; but if there is room in the communication network, transmission might be made at a higher rate than 20 Mbps. On the other hand, the actual meaning of "Peak Rate" is: if a requested QoS (rate) is 20 Mbps, a rate of 20 Mbps is guaranteed; but even if there is room in the communication network, transmission at any higher rate than 20 Mbps will not be made.

Also in TABLE 1, tagging information (Supported Tagging) indicates a domain 3-1 to be combined with a possible supportable target pattern; for example, by linking a domain 3-1 with another domain including "Port:1" in the Supported Target Pattern" column, the information indicates that QoS guarantee can be made.

More specifically, the domain 3-2 (SN-id=2) originally does not support "Port" but will become enable to support "Port" by linking with the domain 3-1 (SN-id=1). This Supported Tagging information can be adopted not only to "Port" but also to other Support Target Patterns.

Namely, the management section 7 manages the tagging information, which discriminates combination of domains 3-i, as additional information so that discrimination of QoS capability in terms of combination of domains 3-i is facilitated, thus reducing time needed for selection of a candidate domain 3-1 having a QoS capability such as to satisfy the required QoS capability and for controlling the selected candidate domain 3-i.

When QoS capability management information is changed, the management section 7 is responsive to such notification to update the QoS capability information of the communication network 4 being managed by the management section 7. Namely, the QoS that can be guaranteed is changed due to introduction of new facility into the domain 3-i, fault or heavy traffic.

For example, if a system (a number of units) composing the domain 3-3 that constitutes the communication network of FIG. 1 has changed to become able to support "TOS", such change is notified from EMS 2-3 to the management section 7 of NMS 1. In response to notification of this change, the management section 7 change the QoS capability layer NW view 42 and the end-to-end QoS capability NW view 43 to update the SN managed objects of TABLE 1.

The request reception section 8 receives a user's request (QoS to be guaranteed) for QoS capability. The QoS request is managed by, for example, a non-illustrated service management system (SMS); for example, the user's request QoS is notified from SMS to the request reception section 8 to start communication. This QoS request may be directly inputted from the user's unit to start communication.

The selection and notification section 9 selects a candidate domain 3-i having such a QoS capability as to satisfy the requested QoS capability, which has been received by the request reception section 8, by searching the end-to-end QoS capability NW view 42 in the management section 7, and then notifies such selection information to EMS 2-i corresponding to the selected candidate domain 3-i.

Assuming that a QoS request named "Source-IP (IP-a)", "Dest-IP (IP-z), WFTP traffic (Port=20)", "Min rate (20 Mbps)" has been made to the request reception section 8, a rate of 20 Mbps at minimum is guaranteed to FTP traffic (Port=20) of a section from IP-a to IP-z.

Specifically, the function of this selection and notification section 9 is accomplished, as shown in FIG. 3, by both an end-to-end QoS policy provisioning performer (E-QPPP), which selects a candidate domain having a QoS capability such as to satisfy the requested QoS on an end-to-end basis, and a layer network QoS policy provisioning performer (LN-QPPP), which selects a plurality of domains 3-i if they exist in a common layer (technology), in the same manner as E-QPPP 13.

The selection and notification section 9 selects plural domains 3-i in view of a preset priority (policy) when selecting the domains 3-i as mentioned in the previous paragraph, and then notifies this selection to EMS 2-i corresponding to a higher-policy domain 3-i.

Specifically, the selection and notification section 8 previously selects plural candidate domains 3-i when selecting a domain 3-i having such a QoS capability so as to satisfy the requested QoS capability received by the request reception section 8, and notifies the preselected candidate domains 3-i to EMS 2-i corresponding to a first candidate domain 3-i. Upon receipt from EMS 2-i corresponding to the first candidate domain 3-i a response indicating that it unables to control the corresponding domain 3-i, then the selection and notification section 9 notifies the preselected candidate domains 3-i to EMS 2-i corresponding to a second candidate domain 3-i.

The above-mentioned policy, which is exemplified by "use domain 3-2 (SN-id=2) with priority in high-speed communication of a higher rate than 50 Mbps" and "use domain 3-3 (SN-id=3) with priority in communication of a rate lower than 50 Mbps", may be set as desired by the carrier.

Following the policy set by the carrier, the selection and notification section 9 selects, as the first candidate, a combination of domains 3-1 (SN-id=1), 3-3 (SN-id=3), and 3-N (SN-id=4), and, as the second candidate, a combination of domains 3-1 (SN-id=1), 3-2 (SN-id=2), 3-N (SN-id=4), and then notifies this selection of candidates to EMS 2-1, 2-3, 2-N corresponding to the first candidate domains 3-1, 3-3, 3-N, As a result, when it has received from EMS 2-1, 2-3, 2-n corresponding to the first candidates a response unable to control at least one of the corresponding domains 3-1, 3-3, 3-N, the management section 7 notifies such selection information to EMS 2-1, 2-2, 2-N of the second candidate domains 3-1, 3-2, 3-N. In this case, the domains 3-i to be selected are two combinations. Alternatively, when three combinations are to be selected, selection and notification of the domains 3-i may be made according to the preset policy in the same manner as described above.

In the meantime, as shown in FIG. 3, EMS 2-i is equipped with a control section 6-i for controlling the corresponding domain 3-i based on the information notified from the selection and notification section 9 of NMS 1. The function of this control section 6-i is realized by SN-QPPP (Subnetwork Quality Policy Provisioning Performer) 15.

A single SN-QPPP 15 is provided for each and every layer of the corresponding domain 3-i and controls a set of units, which compose the corresponding domain 3-i, for every layer, performing QoS policy provisioning such as to satisfy the requested QoS.

The functions of NMS 1, and of the collection and notification section 5-i, the management section 7, the request reception section 8, the selection and notification section 9 and the control section 6-i of EMS 2-i, are realized as CPU (a non-illustrated computer) reads a program recorded in a recording medium, such as a disc device and CD-ROM, in NMS 1 and EMS 2-i to operate.

This program, which is usually recorded in, for example, CD-ROM, is installed into the disc device of the computer from CD-ROM to use. Therefore, each of the disc device and CD-ROM is regarded as a recording medium in which a program for realizing NMS 1 and EMS 2-i is recorded.

The operation of the communication network managing system thus constructed will now be described in detail:

(a) Description on configuration and updating of QoS capability management information at NMS 1

Firstly, at a domain 3-i, when the domain 3-i has been added to the system as a new unit or when QoS capability has been changed due to extension of facility, heavy traffic, etc., the corresponding EMS 2-i collects QoS capability management information of the domain 3-i and notifies the collected QoS capability management information to NMS 1.

Figure 7:
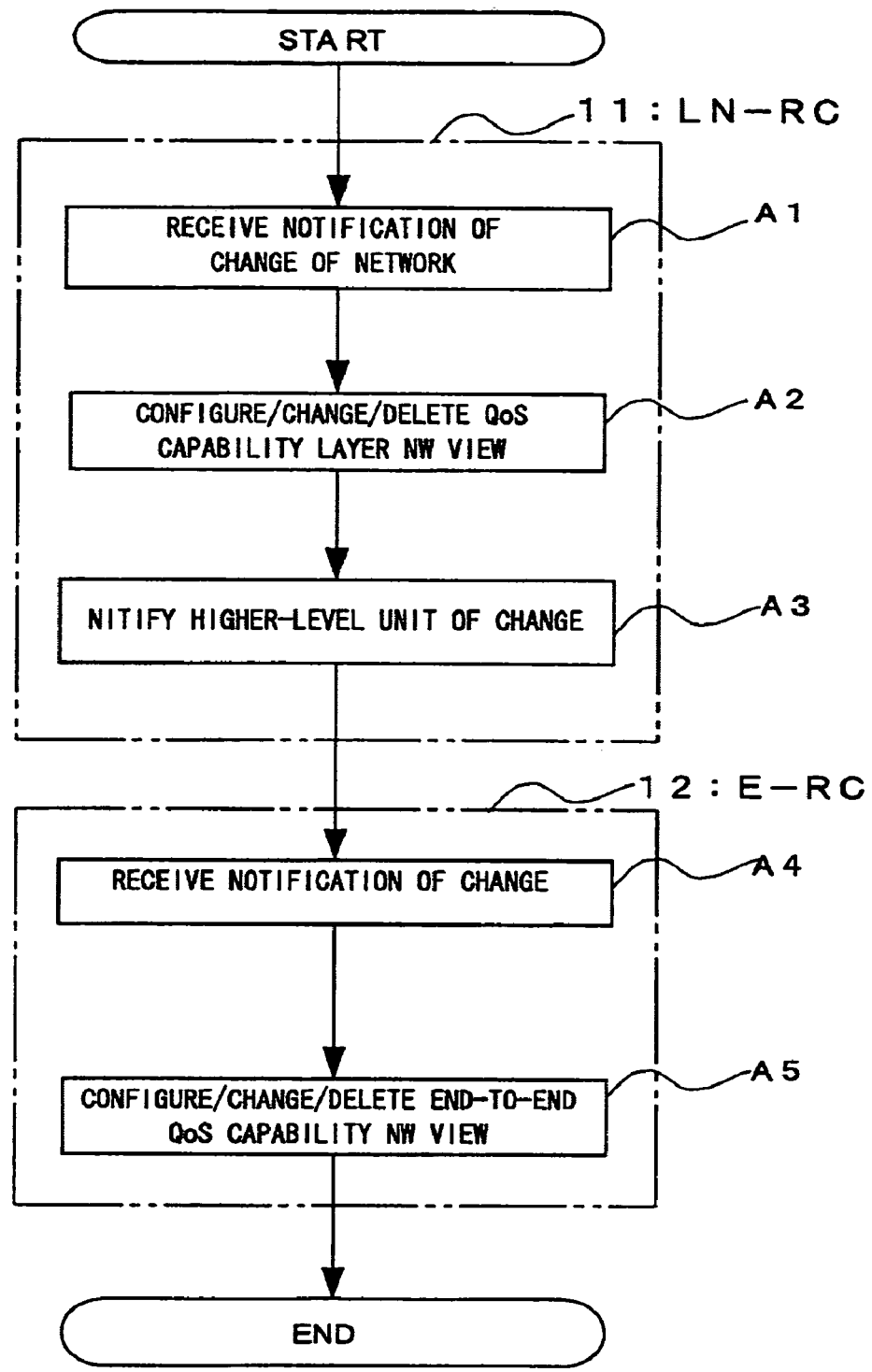
FIG. 7 is a flow diagram illustrating the procedure in which QoS capability management information of the individual subnetwork is updated in the system of the first embodiment.

Then at NMS 1, as shown in FIG. 7, when the QoS capability management information has been received by the management section 7 (step A1), the QoS capability layer NW view 42 is configured/changed/deleted for every technology based on the notified QoS capability management information (step A2).

This configuration/change/deletion is then notified from LN-RC 11 to a higher-level, i.e., E-RC 12 (step A3). Upon receipt of this notice (step A4), E-RC 12 configures/changes/ deletes the end-to-end QoS capability NW view 43 of a united form of technologies in accordance with the configuration/change/deletion of the QoS capability layer NW view 42 (step A5). Thus in management section 78, the QoS capability layer NW view 42 and the end-to-end QoS capability NW view 43 is configured/changed/deleted so that latest QoS view of the domain 3-i is automatically managed all the time.

(b) Description on QoS policy provisioning

Figure 8:
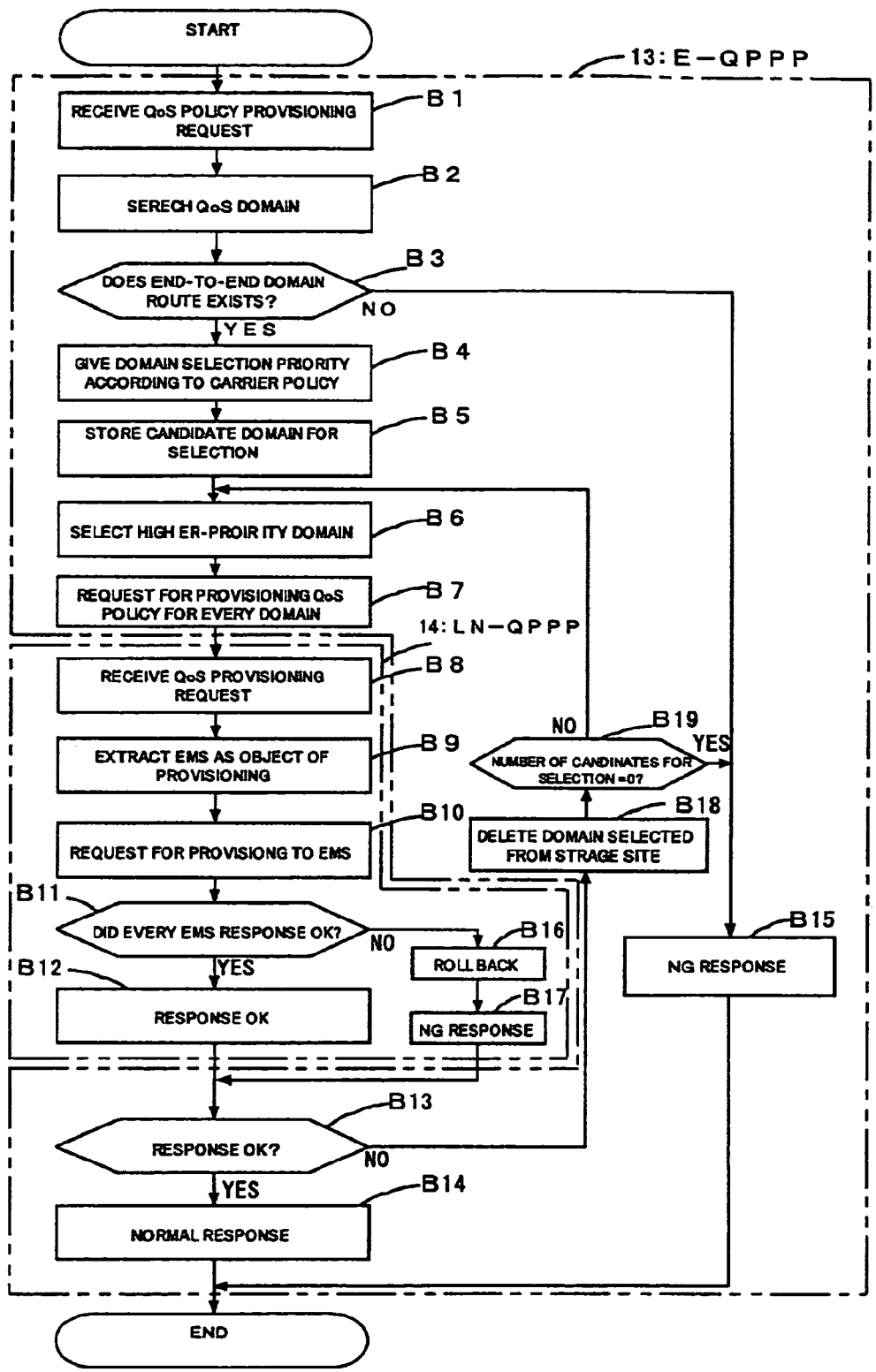
FIG. 8 is a flow diagram illustrating how the system of the first embodiment works (QoS policy provisioning procedure)

Firstly, as shown in FIG. 8, when communication is about to start in an end-to-end basis, the request reception section 8 receives a user's QoS request (QoS policy provisioning performance request) named "guarantee a rate of 20 Mbps at minimum to FTP traffic (Port=20) of a section from IP-a to IP-z" (step B1). This QoS request is then received by E-QPPP 13.

Upon receipt of the QoS request, E-QPPP 13 starts searching domains 3-i such as to satisfy the QoS request (step B2). At that time, E-QPPP 13 searches, in an SN managed object shown in TABLE 1, a combination of domains 3-1, 3-2, 3-N and a combination of domains 3-1, 3-2, 3-N such that the supported target patterns is "Source IP", "Dest IP" and "Port" and the supported service quality of the last-named object is "Min Rate".

As the result of this searching, E-QPPP 13 discriminates whether an end-to-end domain structure (combination) such as to satisfy the QoS request exists (step B3). If no such end-to-end domain structure exists, then E-QPPP 13 makes an NG response to the request reception section 8 as the procedure takes NO route (step B15), whereupon the procedure terminates.

In the meantime, at step B3, if such end-to-end domain structure exists (if Yes route is selected), E-QPPP 13 provides an order of selection of domains in accordance with the policy of the carrier (step B4). As mentioned above, assuming that "use domain (3-2) (SN-id=2) with priority in high-speed communication of a higher rate than 50 Mbps" and "use domain (3-2)((SN-id=2) with priority in communication of a rate lower than 50 Mbps" is preset as the policy of the carrier, then E-QPPP 13 provides a first priority for the combination of domains 3-1, 3-3, 3-N and a second priority for the combination of domains 3-1, 3-2, 3-N.

Then E-QPPP 13 temporarily stores these candidate domains 3-i into a non-illustrated memory (step B5), and then makes selection of particular ones from the stored candidate domains 3-i in the provided order; in this case, the first combination of candidate domains 3-1, 3-3, 3-N is selected (step B6).

Subsequently, E-QPPP 13 requests LN-QPPP 14 to perform QoS policy provisioning for each and every candidate domain 3-1, 3-3, 3-N of the selected first combination (step B7).

Upon receipt of this performance request from E-QPPP 13 (step B8), LN-QPPP 14 extracts EMS 2-1, 2-3, 2-N as the object to perform in accordance with QoS policy provisioning performance request from E-QPPP 13 (step B9), and then supplies QoS policy provisioning performance request respectively to the extracted EMS 2-1, 2-3, 2-N (step B10).

Then LN-QPPP 14 discriminates whether an OK response indicative of enableness of QoS policy has received sequentially from EMS 2-1, 2-3, 2-N to whom LN-QPPP 14 had supplied the performance request (step B11). If all the responses from EMS 2-1, 2-3, 2-N are OK responses, then LN-QPPP 14 supplies an OK response to E-QPPP 13 as the procedure takes YES route (step B12).

And E-QPPP 13 discriminates whether an OK response has been supplied from LN-QPPP 14 (step B13). If the result of this discrimination is positive, E-QPPP 13 makes a normal response to the request reception section 8 (step B14) so that QoS provisioning is performed, whereupon the procedure terminates.

Further, at step B11, if none of EMS 2-1, 2-3, 2-N has issued an OK response, the procedure takes NO route to make a roll-back process to initialize the result of discrimination (step B16), and LN-QPPP 14 issues an NG response to E-QPPP 13 (step B17). In this case, at step B13, as the procedure takes NO route, E-QPPP 13 deletes the selected combination of candidate domains 3-1, 3-3, 3-N (step B18) and discriminates whether any other combination of candidate domains 3-i exists (step B19). If the result of this discrimination is positive, then the procedure takes NO route to restart from step B6. Namely, the same procedure is repeated from step B6 but for the second combination of candidate domains 3-1, 3-2, 3-N.

And at step B19, if the result of the last-named discrimination is negative, the procedure takes YES route so that E-QPPP 13 issues an NG response to the request reception section 8 (step B15), whereupon the procedure terminates.

Figure 6:
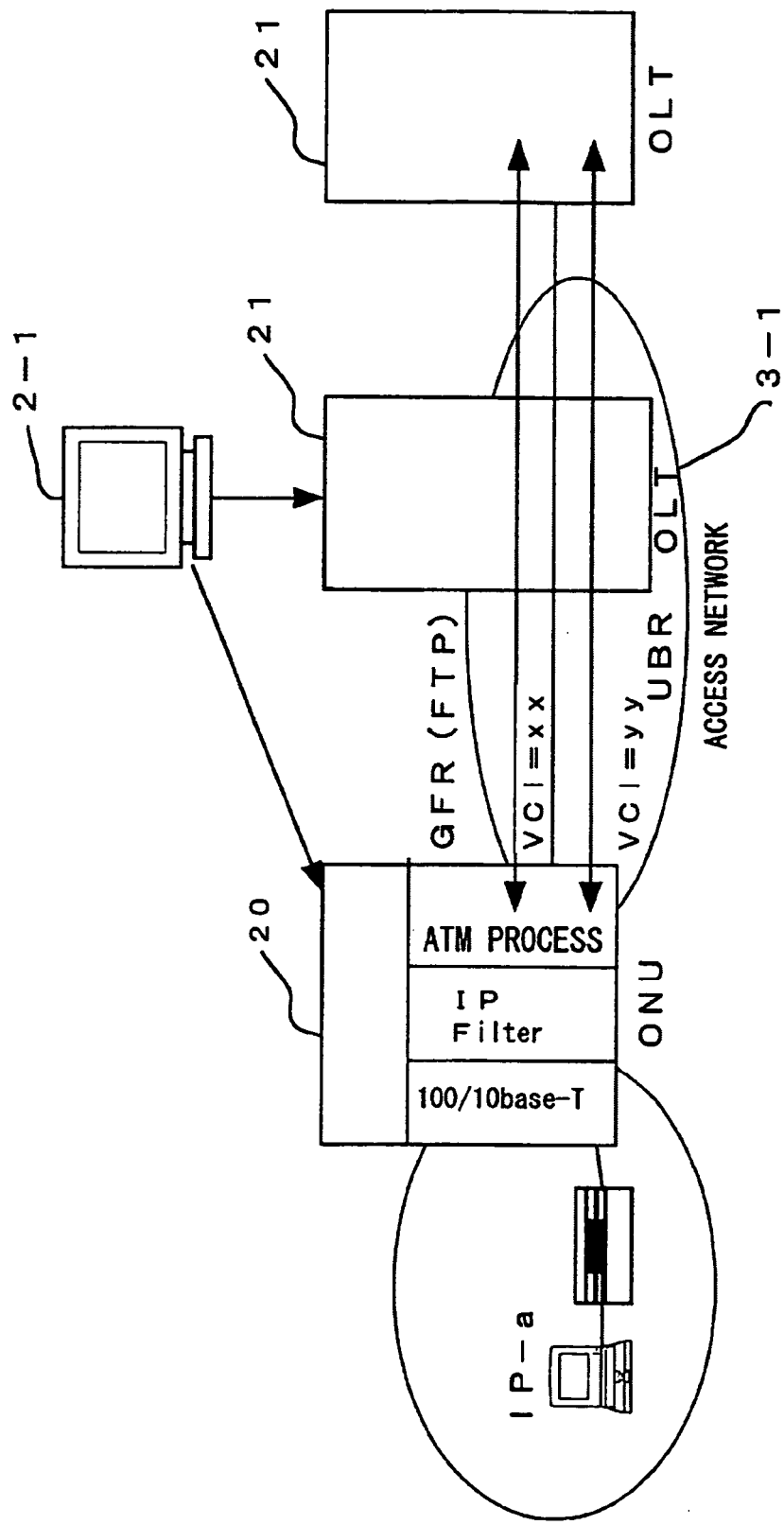
FIG. 6 is a block diagram showing an example of topology in which an access network is composed of ONU and OLT in the system of the first embodiment.

Now assume that, as shown in FIG. 6, the domain 3-1 (access network (ATM)) of FIG. 1 is composed of a user unit, called ONU (Optical Network Unit), 20 and an Office unit, called OLT (Optical Line Terminator), 21. If the requested QoS is "guarantee a rate of 20 Mbps at minimum to FTP traffic (Port=20) of a section from IP-a to IP-z, and make transmission with best effort for the other communication", EMS 2-1 receives such notice from the network manager (not shown in FIG. 6) in the above-mentioned manner, and sets a minimum rate guaranteed path called GFRPVC (Guaranteed Frame Rate Permanent Virtual Connection) between ONU 20 and OLT 21 of the access network (ATM).

ONU 20 takes 100/10BASE-T process for OP packet to be transmitted, and sets, in an IP filter, filter information to separately route the P packet to GFRPVC with reference to IP address and Port field of the IP packet, and also converts data of this IP packet into ATM cells so that communication takes place through VCI=xx as shown in FIG. 6.

In the case of other requests, for example, if the request is different in "Dest-IP" or if the request is not for FTP traffic with "Dest-IP" being identical, communication takes place with best effort, i.e. at an unspecified bit rate (UBR), through VCI=yy. Thus inside the domain 3-1, a rate of 20 Mbps at minimum is guaranteed; for other requests, a network control satisfying the user's requested Qos such that transmission should be made with best effort (UBR).

The same network control takes place for the remaining domains 3-2, 3-N, and as a result, a rate of 20 Mbps at minimum is guaranteed to FTP traffic (Port=20) of a section from IP-a to IP-z.

According to the communication network managing system of the first embodiment, because NMS 1 concentratedly manages QoS capabilities of the domains 3-i notified from EMS 2-i (namely, manages regarding the domains 3-i as minimum managed units), and performs QoS policy provisioning in accordance with the user's requested QoS capability, it is possible to obtain a combination of domains 3-i satisfying the user's requested QoS capability on an end-to-end basis comfortably at high speed, so that the user's requested QoS can always be guaranteed precisely and quickly, irrespective of the domains 3-i through which communication traffic runs on an end-to-end basis, without managing QoS of the involved units, which constitute each domain 3-i, in terms of units.

Further, according to the communication network managing system of the first embodiment, since guarantee of the user's requested QoS is realized by an abstract information model, independent of the technology (topology), it is possible to readily cope with not only domains of technologies other than the above-mentioned technology, but also any added domain of a new technology.

(B) Second Embodiment

Figure 9:
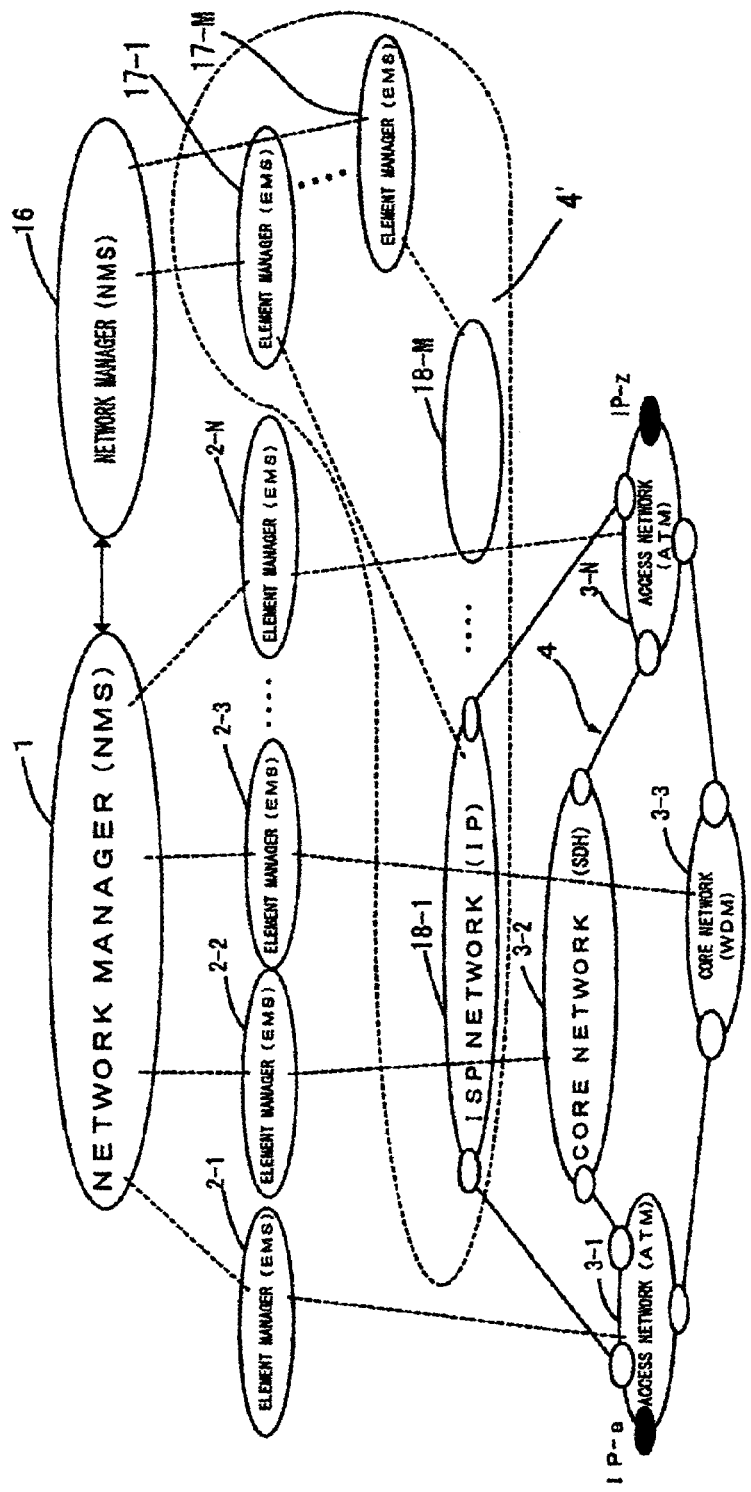
FIG. 9 is a block diagram showing an alternative communication network managing system according to a second embodiment of the present invention.

FIG. 9 is a block diagram showing a modified communication network managing system according to a second embodiment of the present invention. The modified managing system of FIG. 9 is similar in structure to the managing system of the first embodiment except that it is equipped with a plurality of EMS 17-j (j=1, 2, . . . , M), and NMS 16 managing these EMS 17-j in correspondence with a plurality of domains, such as an ISP (Internet Service Provider) network, 18-1, 18-2, . . . , 18-M (M is an integer equal to or larger than 2) that constitute another communication network (hereinafter called the second communication network) 4' of a different carrier (hereinafter called the second carrier).

It is now assumed that the second communication network 4' of the second carrier is associated with the communication network (hereinafter called the first communication network) 4 of the own carrier (hereinafter called the first carrier) by an agreement of the two communication network companies so that the domains 18-1 of the second communication network 4' can be used in the first communication network 4. Therefore, NMS 1 of the second embodiment concentratedly manages QoS capabilities of the domains 3-i constituting the first communication network 4 of the first carrier, but also QoS capabilities of the domains 18-1 constituting the second communication network 4' of the second carrier, in view of QoS capability management information of the domains 18-1.

Figure 10:
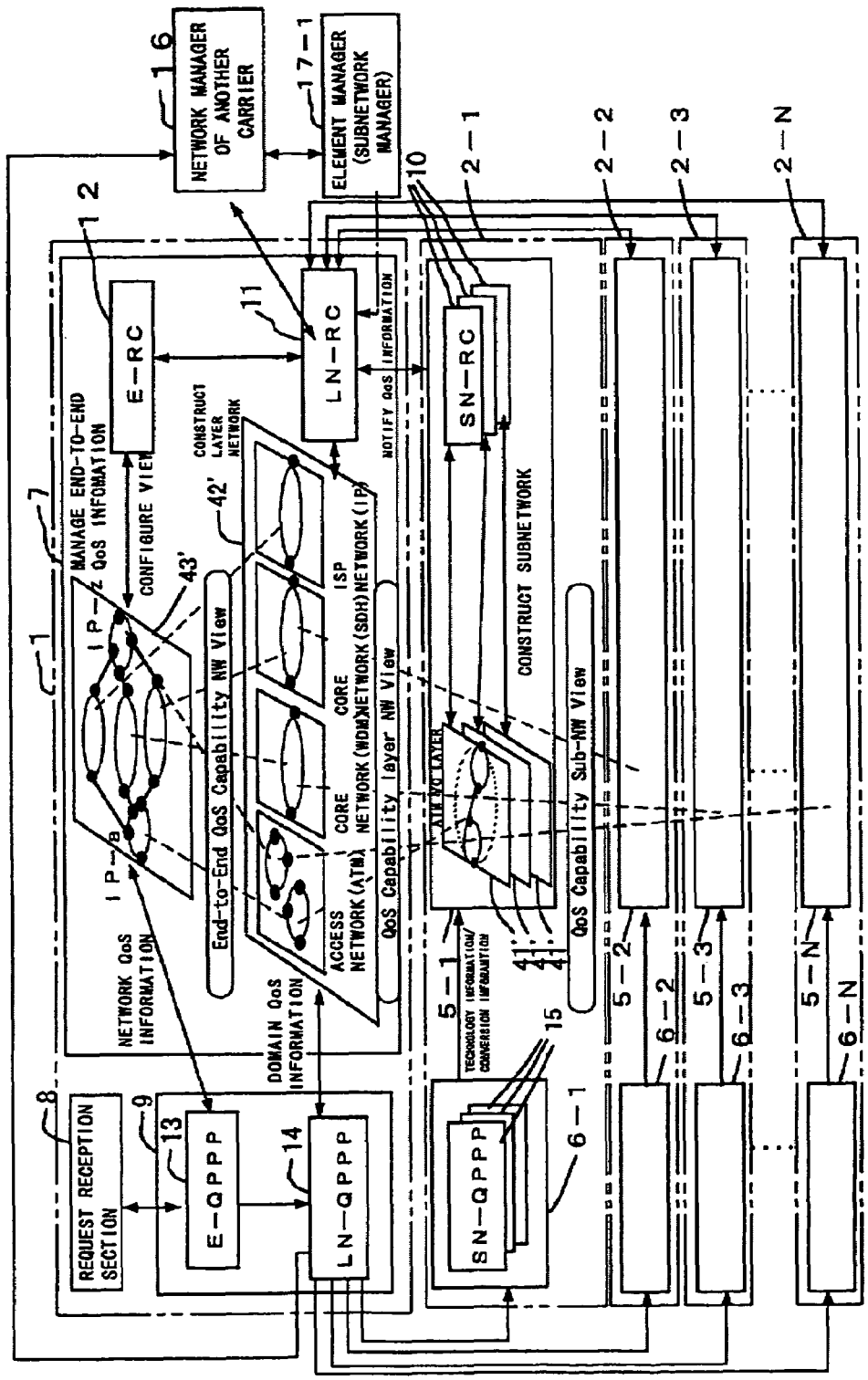
FIG. 10 is a detail block diagram of the system according to the second embodiment.

Specifically, in the modified communication network managing system, as shown in FIG. 10, LN-RC 11 of a management section 7 receives notice of QoS capability management information of the domains 18-1 from NMS 16 of the second communication network 4' of the second carrier, and configures a QoS capability layer NW view 42' in view of the QoS capability of the domains 18-1 of the second carrier in addition to the QoS capability management information of the domains 3-i of the first carrier. Based on the QoS capability layer NW view 42', E-RC 12 configures an end-to-end QoS capability NW view 43' also in view of the QoS capability management information of the domain 18-1.

Alternatively, the QoS capability management information of the domains 18-1 of the second communication network 4' of the second carrier may be notified from EMS 17-1 that is provided in correspondence to the domains 18-1.

This end-to-end QoS capability NW view 43' is managed by linking the SN managed object for the domains 3-1 of the first communication network 4 first carrier (TABLE 1) with the SN managed object for the domains 18-1 of the second communication network 4' of the second carrier, as shown in TABLE 2 below.

TABLE 2

SN MANAGED OBJECTS

| SN-id | Supported Target Pattern | Supported Service Quality | Supported Tagging |
|---|---|---|---|
| 1 Domain 3-1 | Source-IP, Dest-IP | Peak Rate, Min Rate, BestEffort | Port:1 |
| | TOS, Port | Peak Rate, Min Rate, Priority, BestEffort | |

TABLE 2-continued

SN MANAGED OBJECTS

| SN-id | Supported Target Pattern | Supported Service Quality | Supported Tagging |
|---|---|---|---|
| 2 Domain 3-2 | Source-IP, Dest-IP Port:1 | Peak Rate, Min Rate | |
| 3 Domain 3-3 | Source-IP Port | Peak Rate, Min Rate | |
| 4 Domain 3-N | Source-IP, Dest-IP | Peak Rate, Min Rate, Priorityt | |
| | TOS, Port | Peak Rate, Min Rate, Priority BestEffort | |
| 5 Domain 18-1 | Source-IP, Dest-IP Port | Peak Rate, Min Rate Peak Rate | |

In an alternative form, this management may be realized in a concentrated manner in which the domains 18-1 of the second carrier are united with the domains 3-i of the first carrier as the common SN managed objects.

Now assuming that the requested QoS capability received by a request reception section 8 is "guarantee a rate of 20 Mbps at minimum for FTP traffic of a section from IP-a to IP-z" likewise in the first embodiment, it would become possible to select, as such combinations of domains as to satisfy the required QoS, the first combination of domains 3-1, 3-3, 3-N and the second combination of domains 3-1, 3-2, 3-N as well as another, mixed combination of domains 3-1, 18-1, 3-N including the domains 18-1 of the second communication network 4' of the second carrier.

Further, assume that, a policy named "do not use the domains 18-1 of the second carrier unless no other candidates are available", in addition to the above-mentioned policies "use domain 3-2 (SN-id=2) with priority in high-speed communication of a higher rate than 50 Mbps" and "use domain 3-3 (Sn-id=3) with priority in communication of a rate lower than 50 Mbps". In this case, the first, second and third candidates would be a combination of domains 3-1, 3-3, 3-N, a combination of domains 3-1, 3-2, 3-N, and a combination of domains 3-1, 18-1, 3-N; therefore, when either of the first and second candidates cannot be selected, then the third candidate containing the domains 18-1 of the second carrier is selected as domains as the objects whom QoS policy provisioning is to be performed.

The operation of the modified communication network managing system according to the second embodiment is different from that of the first embodiment in that, at steps B2, B3 of the flow diagram shown in FIG. 8, searching of domains in view of the QoS capability management information for the domains 18 of the second carrier is performed. In the second embodiment, the remaining operations (including the updating procedure of the QoS capability layer NW view 42' and the end-to-end QoS capability NW view 43') are identical with the operation described in connection with the first embodiment (FIGS. 7 and 8).

According to the modified communication network managing system of the second embodiment, since NMS 1 sets the QoS policy provisioning in view of the QoS capability management information also for the domains 18-1 of the second carrier, it is possible not only to offer the same advantageous results as those of the first embodiment, but to choose the end-to-end communication traffic including the domains 18-1 of the second carrier, realizing a more efficient management of communication network.

(C) Alternatives

In the first and second embodiments, the domains 3-1, 3-2, ..., 3-N constituting the communication network 4 are constructed in a multi-technology form. Alternatively, they may be constructed in a single-technology form, such as an access network (ATM). In the case of this alternative, since the end-to-end QoS capability can be grasped by the QoS capability layer SN VIEW 42 (42') configured by LN-RC 11, E-RC 123 would become needless, so E-QPPP 13 also would become needless.

Further, in the second embodiment, among the domains of the second communication network 4' of the second carrier, the domain for whom the first communication network 4 of the first carrier can be used is only the domain 18-1. Alternatively, all or part of the remaining domains 18-2, 18-3, ..., 18-N that constitute the second communication network 4' may be used. In another alternative, two or more communication networks of different carriers to be considered by NMS 1 may exist.

The present invention should by no means be limited to the individual illustrated examples, and various changes or modifications may be suggested without departing from the gist of the inventive concept.

What is claimed is:

1. A system for managing a communication network composed of a plurality of subnetworks, comprising:
    a plurality of element managers provided one for each of the plural subnetworks, at least one subnetwork of the plurality of the subnetworks having a different technology than other subnetworks of the plurality of subnetworks; and
    a network manager accommodating said plural element managers for concentrated management thereof; wherein
    each of said plural element managers having a collection and notification section for collecting QoS (Quality of Service) capability management information on the corresponding element manager and notifying said network manager of the collected QoS capability management information;
    said network manager having
    a management section including a function object group which performs a control of QoS policy provisioning over the communication network and an information object group which manages network information of each of the plural subnetworks, and for concentratedly managing various QoS capabilities of the whole communication network, based on the QoS capability management information collected and notified by the individual element managers,
    a request reception section for receiving a request for a target QoS capability, and
    a selection and notification section for selecting a candidate subnetwork having a QoS capability such as to satisfy a target pattern indicating a guarantee of QoS including at least one of the processing capability of layer 3 and layer 4, and service quality indicating a guaranteeable quality to the target, for which the request has been received by said request reception section, based on the various QoS capabilities being managed by said management section, and for notifying said element manager corresponding to the selected candidate subnetwork of selection information indicating that the candidate subnetwork has been selected; and
    each of said element managers further having a control section for controlling the corresponding subnetwork based on the selection information notified by said selection and notification section of said network manager.

2. A system for managing a communication network composed of a plurality of subnetworks, comprising:
    a plurality of element managers provided one for each of the plural subnetworks for individual management thereof, at least one subnetwork of the plurality of the subnetworks having a different technology than other subnetworks of the plurality of subnetworks; and
    a network manager accommodating said plural element managers for concentrated management thereof; wherein
    each of said plural element managers having a collection and notification section for collecting QoS (Quality of Service) capability management information on the corresponding element manager and notifying said network manager of the collected QoS capability management information including which subnetworks satisfy a target pattern indicating a guarantee of QoS including at least one of the processing capability of layer 3 and layer 4, and service quality indicating a guaranteeable quality to the target;
    said network manager having
    a management section including a function object group which performs a control of QoS policy provisioning over the communication network and an information object group which manages network information of each of the plural subnetworks, and for concentratedly managing various QoS capabilities of the whole communication network, based on the QoS capability management information collected and notified by the individual element managers.

3. An element manager for use in a communication network managing system, which manages a communication network composed of a plurality of subnetworks and includes a plurality of element managers corresponding to the plural subnetworks and a network manager accommodating the plural element managers, said element manager comprising:
    a collection and notification section for collecting QoS (Quality of Service) capability management information to be used in managing the corresponding subnetwork, and for notifying the network manager of the collected QoS capability management information; and
    a control section for controlling the corresponding subnetwork based on information which is obtained by the network manager, said network manager having a function object group which performs a control of QoS policy provisioning over the communication network and an information object group which manages network information of each of the plural subnetworks and a function of concentratedly managing QoS capabilities of the communication network based on said QoS capability management information collected and notified by said collection and notification section, and said information is notified from the network manager on the candidate subnetwork having a QoS capability such as to satisfy a target pattern indicating a guarantee of QoS including at least one of the processing capability of layer 3 and layer 4, and service quality indicating a guaranteeable quality to the target for the corresponding subnetwork, at least one subnetwork of the plurality of the subnetworks having a different technology than other subnetworks of the plurality of subnetworks.

4. An element manager for use in a communication network managing system, which manages a communication network composed of a plurality of subnetworks and includes a plurality of element managers corresponding to the plural subnetworks, and a network manager accommodating the plural element managers, said network manager having a function object group which performs a control of QoS policy provisioning over the communication network and an information object group which manages network information of each of the plural subnetworks, wherein said element manager has a collection and notification section for collecting QoS (Quality of Service) capability management information to be used in managing the corresponding subnetwork, and for notifying the network manager of the collected QoS capability management information, including which subnetworks satisfy a target pattern representing a QoS-guaranteeable target indicating a guarantee of QoS including at least one of the processing capability of layer 3 and layer 4, and service quality indicating a guaranteeable quality to the target, at least one subnetwork of the plurality of the subnetworks having a different technology than other subnetworks of the plurality of subnetworks.

5. A network manager for use in a communication network managing system, which manages a communication network composed of a plurality of subnetworks and includes a plurality of element managers corresponding to the plural subnetworks, and a network manager accommodating the plural element managers, said network manager comprising:

a management section including a function object group which performs a control of QoS policy provisioning over the communication network and an information object group which manages network information of each of the plural subnetworks, and for concentratedly managing various QoS (Quality of Service) capabilities of the whole communication network, based on QoS capability management information of the corresponding subnetworks, which information has been collected and notified by the individual element managers;

a request reception section for receiving a request for a target QoS capability; and a selection and notification section for selecting a candidate subnetwork having a QoS capability such as to satisfy a target pattern representing a QoS-guaranteeable target indicating a guarantee of Qos including at least one of the processing capability of layer 3 and layer 4, and service quality indicating a guaranteeable quality to the target, for which the request has been received by said request reception section, based on the various QoS capabilities being managed by said management section, and for notifying the element manager corresponding to the selected subnetwork of selection information that the candidate subnetwork has been selected, at least one subnetwork of the plurality of the subnetworks having a different technology than other subnetworks of the plurality of subnetworks.

6. A network manager for use in a communication network managing system according to claim 5, wherein said selection and notification section is constructed to previously select two or more of the subnetworks when selecting the candidate subnetworks having communication QoS capabilities such as to individually satisfy the target QoS capability, for which the request has been received by said request reception section, to first notify one element manger, corresponding to a first one of the candidate subnetworks, of the previous selection of the plural subnetworks and secondly notify another element manager, corresponding to a second one of the candidate subnetworks, of unable information that the corresponding first candidate subnetwork cannot be controlled, upon receipt of the unable information as a response from the element manager corresponding to the first candidate subnetwork, at least one subnetwork of the plurality of the subnetworks having a different technology than other subnetworks of the plurality of subnetworks.

7. A network manager for use in a communication network managing system which manages a communication network composed of a plurality of subnetworks and includes a plurality of element managers corresponding to the plural subnetworks, and a network manager accommodating the plural element managers, wherein said network manager has a management section including a function object group which performs a control of QoS policy provisioning over the communication network and an information object group which manages network information of each of the plural subnetworks, and for concentratedly managing various QoS (Quality of Service) capabilities of the whole communication network, based on QoS capability management information of the corresponding subnetworks, which information has been collected and notified by the individual element managers and includes which subnetworks satisfy a target pattern representing a QoS-guaranteeable target indicating a guarantee of QoS including at least one of the processing capability of layer 3 and layer 4, and service quality indicating a guaranteeable quality to the target, at least one subnetwork of the plurality of the subnetworks having a different technology than other subnetworks of the plurality of subnetworks.

8. A network manager for use in a communication network managing system, which manages a communication network composed of a plurality of subnetworks and includes a plurality of element managers corresponding to the plural subnetworks, and a network manager accommodating the plural element managers, said network manager comprising:

a management section for concentratedly managing various QoS (Quality of Service) capabilities of the whole communication network, based on QoS capability management information of the corresponding subnetworks, which information has been collected and notified by the individual element managers;

a request reception section for receiving a request for a target QoS capability; and a selection and notification section for selecting a candidate subnetwork having a QoS capability such as to satisfy a target pattern representing a QoS-guaranteeable target indicating a guarantee of QoS including at least one of the processing capability of layer 3 and layer 4, and service quality indicating a guaranteeable quality to the target, for which the request has been received by said request reception section, based on the various QoS capabilities being managed by said management section, and for notification the element manager corresponding to the selected subnetwork of selection information that the candidate subnetwork has been selected, wherein said management section is constructed to concentratedly manage the various QoS capabilities of said communication network and those of another communication network independent of said communication network in view of other QoS capability management information of other subnetworks that constitute said other communication network, at least one subnetwork of the plurality of the subnetworks having a different technology than other subnetworks of the plurality of subnetworks.

9. A network manager for use in a communication network managing system according to claim 8, wherein said management section is constructed to manage supported tagging, as additional information, for discrimination on combination of the subnetworks.

10. A network manager for use in a communication network managing system according to claim 9, wherein said management section is constructed to update the various QoS capabilities of the communication network when said QoS capability management information is updated.

11. A network manager for use in a communication network managing system, which manages a communication network composed of a plurality of subnetworks and includes a plurality of element managers corresponding to the plural subnetworks, and a network manager accommodating the plural element managers, said network manager comprising:
   a management section for concentratedly managing various QoS (Quality of Service) capabilities of the whole communications network, based on QoS capability management information of the corresponding subnetworks, which information has been collected and notified by the individual element managers;
   a request reception section for receiving a request for a target QoS capability; and
   a selection and notification section for selecting a candidate subnetwork having a QoS capability such as to satisfy a target pattern representing QoS-guaranteeable target indicating a guarantee of QoS including at least one of the processing capability of layer 3 and layer 4, and service quality indicating a guaranteeable quality to the target, for which the request has been received by said request reception section, based on the various QoS capabilities being managed by said management section, and for notifying the element manager corresponding to the selected subnetwork of selection information that the candidate subnetwork has been selected,
   wherein said management section is constructed to manage supported tagging, as additional information, for discrimination on combination of the subnetworks, as least one subnetwork of the plurality of the subnetworks having a different technology than other subnetworks of the plurality of subnetworks.

12. A network manager for use in a communication network managing system according to claim 11, wherein said management section is constructed to update the various QoS capabilities of the communication network when said QoS capability management information is updated.

13. A network manager for use in a communication network managing system, which manages a communication network composed of a plurality of subnetworks and includes a plurality of element managers corresponding to the plural subnetworks, and a network manager accommodating the plural element managers, said network manager comprising:
   a management section for concentratedly managing various QoS (Quality of Service) capabilities of the whole communication network, based on QoS capability management information of the corresponding subnetworks, which information has been collected and notified by the individual element managers;
   a request reception section for receiving a request for a target QoS capability; and
   a selection and notification section for selecting a candidate subnetwork having a QoS capability such as to satisfy a target pattern representing a QoS indicating a guarantee of QoS including at least one of the processing capability of layer 3 and layer 4, and service quality indicating a guaranteeable quality to the target, for which the request has been received by said request reception section, based on the various QoS capabilities being managed by said management section, and for notifying the element manager corresponding to the selected subnetwork of selection information that the candidate subnetwork has been selected,
   wherein said management section is constructed to update the various QoS capabilities of the communication network when said QoS capability management information is updated, at least one subnetwork of the plurality of the subnetworks having a different technology than other subnetworks of the plurality of subnetworks.

14. A network manager for use in a communication network managing system, which manages a communication network composed of a plurality of subnetworks and includes a plurality of element managers corresponding to the plural subnetworks, and a network manager accommodating the plural element managers, said network manager comprising:
   a management section for concentratedly managing various QoS (Quality of Service) capabilities of the whole communication network, based on QoS capability management information of the corresponding subnetworks, which information has been collected and notified by the individual element managers;
   a request reception section for receiving a request for a target QoS capability; and
   a selection and notification section for selecting a candidate subnetwork having a QoS capability such as to satisfy a target pattern representing a QoS-guaranteeable target indicating a guarantee of QoS including at least one of the processing capability of layer 3 and layer 4, and service quality indicating a guaranteeable quality to the target, for which the request has been received by said request reception section, based on the various QoS capabilities being managed by said management section, and for notifying the element manager corresponding to the selected subnetwork of selection information that the candidate subnetwork has been selected,
   wherein said selection and notification section is constructed to select two or more of the subnetworks according to preset priorities when selecting the candidate subnetworks having QoS capabilities such as to individually satisfy the target QoS capability, for which the response has been received by said request reception section, and to notify one element manager, corresponding to a higher-priority one of the candidate subnetworks, of the selection, at least one subnetwork of the plurality of the subnetworks having a different technology than other subnetworks of the plurality of subnetworks.

15. A computer-readable recording medium in which a program is recorded for instructing a computer to be used in a communication network management system including a plurality of element managers corresponding to a plurality of subnetworks that constitute a communication network, and a network manager accommodating the plural element managers, wherein said program instructs said computer to function as the following:
   collecting and notifying means for collecting QoS (Quality of Service) capability management information on a corresponding element manager and notifying said network manager of the collected QoS capability management information; and
   control means for controlling the corresponding subnetwork based on information which is obtained by the network manager, the network manager including a function object group which perform a control of QoS policy provisioning over the communication network and an information object group which manages network information of each of the plural subnetworks and also having a function of concentratedly managing various QoS capabilities of the whole communication network based on said QoS capability management information collected and notified by said collecting and notifying means and which is notified from the network manager on the candidate subnetwork having a QoS capability such as to satisfy a target pattern representing a QoS-guaranteeable target indicating a guarantee of QoS including at least one of the processing capability of layer 3 and layer 4, and service quality indicating a guaranteeable quality to the target for the individual subnetwork, at least one subnetwork of the plurality of the subnetworks having a different technology than other subnetworks of the plurality of subnetworks.

16. A computer-readable recording medium in which a program is recorded for instructing a computer to be used in a communication network managing system including a plurality of element managers corresponding to a plurality of subnetworks that constitute a communication network, and a network manager accommodating the plural element managers, wherein said program instructs said computer to function as collecting and notifying means for collecting various QoS capability management information on the individual element managers and notifying said network manager of the collected QoS capability management information including which subnetworks satisfy a target pattern representing a QoS-guaranteeable target indicating a guarantee of QoS including at least one of the processing capability of layer 3 and layer 4, and service quality indicating a guaranteeable quality to the target, the network manager including a function object group which perform a control of QoS policy provisioning over the communication network and an information object group which manages network information of each of the plural subnetworks, at least one subnetwork of the plurality of the subnetworks having a different technology than other subnetworks of the plurality of subnetworks.

17. A computer-readable recording medium in which a program is recorded for instructing a computer to be used in a communication network managing system including a plurality of element managers corresponding to a plurality of subnetworks that constitute a communication network, and a network manager accommodating the plural element managers, wherein said program instructs said computer to function as the following:

managing means performing control of QoS policy provisioning over the communication network and managing network information of each of the plural subnetworks, and for concentratedly managing various QoS (Quality of Service) capabilities of the whole communication network, based on QoS capability management information of the corresponding subnetworks, which information is collected and notified by the individual element managers;

request receiving means for receiving a request for target QoS capability; and selecting and notifying means for selecting a candidate subnetwork having a QoS capability such as to satisfy a target pattern representing a QoS-guaranteeable target indicating a guarantee of QoS including at least one of the processing capability of layer 3 and layer 4, and service quality indicating a guaranteeable quality to the target, for which the request has been received by said request receiving means, based on the QoS capabilities being managed by said managing means, and for notifying the element manager corresponding the selected subnetwork of selection information that the candidate subnetwork has been selected, at least one subnetwork of the plurality of the subnetworks having a different technology than other subnetworks of the plurality of subnetworks.

18. A computer-readable recording medium in which a program is recorded for instructing a computer to be used in a communication network management system including a plurality of element managers corresponding to a plurality of subnetworks that constitute a communication network, and a network manager accommodating the plural element managers, wherein said program instructs said computer to function as managing means including performing a control of QoS policy provisioning over the communication network and managing network information of each of the plural subnetworks, and for concentratedly managing various QoS (Quality of Service) capabilities of the network, based on QoS capability management information of the corresponding subnetworks, including which subnetworks satisfy a target pattern representing a QoS-guaranteeable target indicating a guarantee of QoS including at least one of the processing capability of layer 3 and layer 4, and service quality indicating a guaranteeable quality to the target, which information has been collected and notified by the individual element managers, at least one subnetwork of the plurality of the subnetworks having a different technology than other subnetworks of the plurality of subnetworks.

19. A network manager for use in a communication network managing system which manages a communication network composed of a plurality of subnetworks and includes a plurality of element managers corresponding to the plural subnetworks, and a network manager accommodating the plural element managers, wherein said network manager has a management section for concentratedly managing various QoS (Quality of Service) capabilities of the whole communication network, based on QoS capability management information of the corresponding subnetworks, including which subnetworks satisfy a target pattern representing a QoS-guaranteeable target indicating a guarantee of QoS including at least one of the processing capability of layer 3 and layer 4, and service quality indicating a guaranteeable quality to the target, which information has been collected and notified by the individual element managers, and wherein said management section is constructed to concentratedly manage the various QoS capabilities of said communication network and those of another communication network independent of said communication network in view of other QoS capability management information of other subnetworks that constitute said other communication network, at least one subnetwork of the plurality of the subnetworks having a different technology than other subnetworks of the plurality of subnetworks.

20. A network manager for use in a communication network managing system according to claim 19, wherein said management section is constructed to manage supported tagging, as additional information, for discrimination on combination of the subnetworks.

21. A network manager for use in a communication network managing system according to claim 20, wherein said management section is constructed to update the various QoS capabilities of the communication network when said QoS capability management information is updated.

22. A network management for use in a communication network managing system which manges a communication network composed of a plurality of subnetworks and includes a plurality of element managers corresponding to the plural subnetworks, and a network manager accommodating the plural element managers, wherein said network manager has a management section for concentratedly managing various QoS (Quality of Service) capabilities of the whole communication network, based on QoS capability management information of the corresponding subnetworks, including which subnetworks satisfy a target pattern representing a QoS-guaranteeable target indicating a guarantee of QoS including at least one of the processing capability of layer 3 and layer 4, and service quality indicating a guaranteeable quality to the target, which information has been collected and notified by the individual element managers, and wherein said management section is constructed to manage supported tagging, as additional information, for discrimination on combination of the subnetworks, at least one subnetwork of the plurality of the subnetworks having a different technology than other subnetworks of the plurality of subnetworks.

23. A network manager for use in a communication network managing system according to claim 22, wherein said management section is constructed to update the various QoS capabilities of the communication network when said QoS capability management information is updated.

24. A network manager for use in a communication network managing system which manages a communication network composed of a plurality of subnetworks and includes a plurality of element managers corresponding to the plural subnetworks, and a network manager accommodating the plural element managers, wherein said network manager has a management section for concentratedly managing various QoS (Quality of Service) capabilities of the whole communication network, based on QoS capability management information of the corresponding subnetworks, including which subnetworks satisfy a target pattern representing a QoS-guaranteeable target indicating guarantee of QoS including at least one of the processing capability of layer 3 and layer 4, and service quality indicating a guaranteeable quality to the target, which information has been collected and notified by the individual element managers, and wherein said management section is constructed to update the various QoS capabilities of the communication network when said QoS capability management information is updated, at least one subnetwork of the plurality of the subnetworks having a different technology than other subnetworks of the plurality of subnetworks.

* * * * *